March 7, 1939.  E. KLAHN  2,149,892
THERMOSTATIC DEVICE
Filed Aug. 5, 1931  5 Sheets-Sheet 1

Inventor:
Emil Klahn,
By his Attorney,

March 7, 1939.  E. KLAHN  2,149,892
THERMOSTATIC DEVICE
Filed Aug. 5, 1931   5 Sheets-Sheet 2
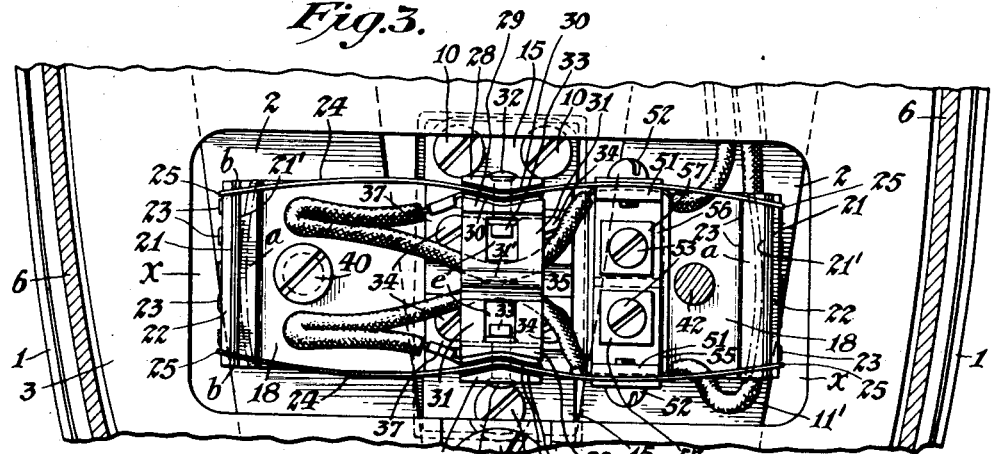
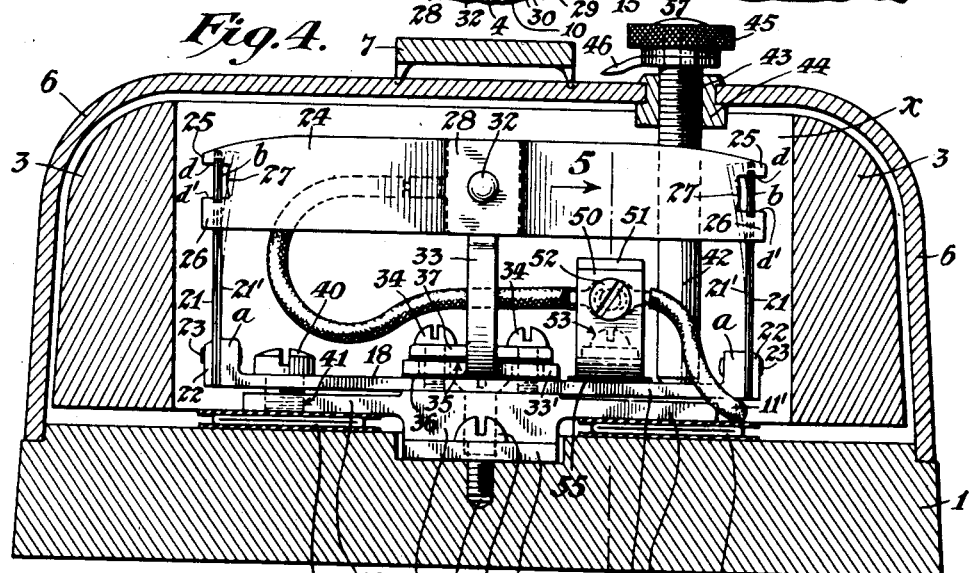
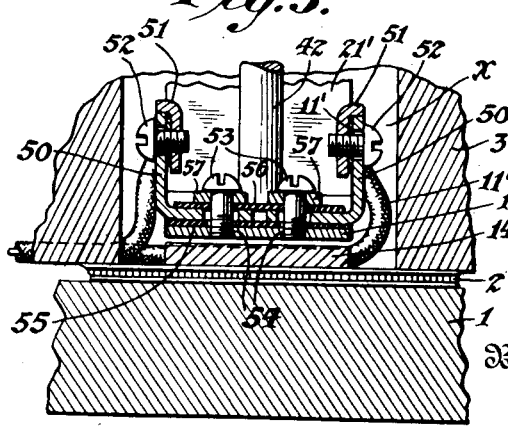
Inventor:
Emil Klahn,
By his Attorney, March 7, 1939.  E. KLAHN  2,149,892
THERMOSTATIC DEVICE
Filed Aug. 5, 1931  5 Sheets-Sheet 3
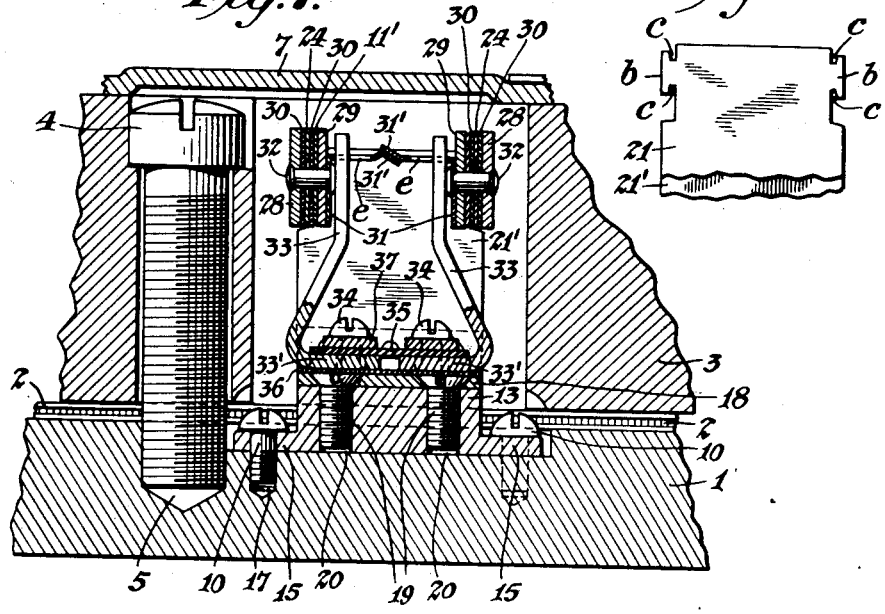
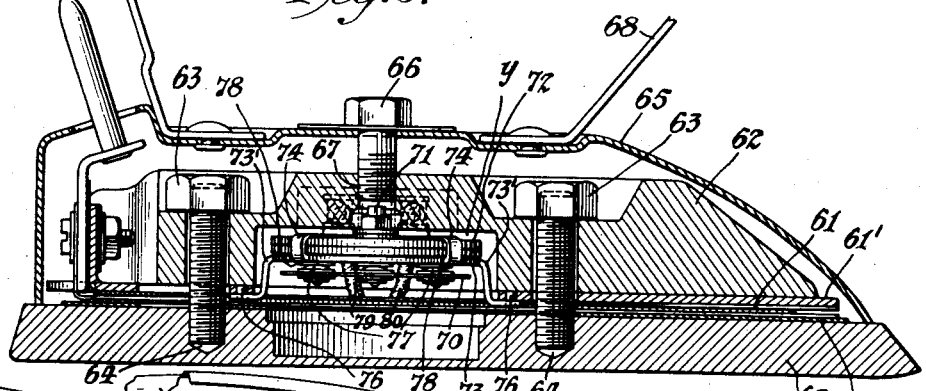
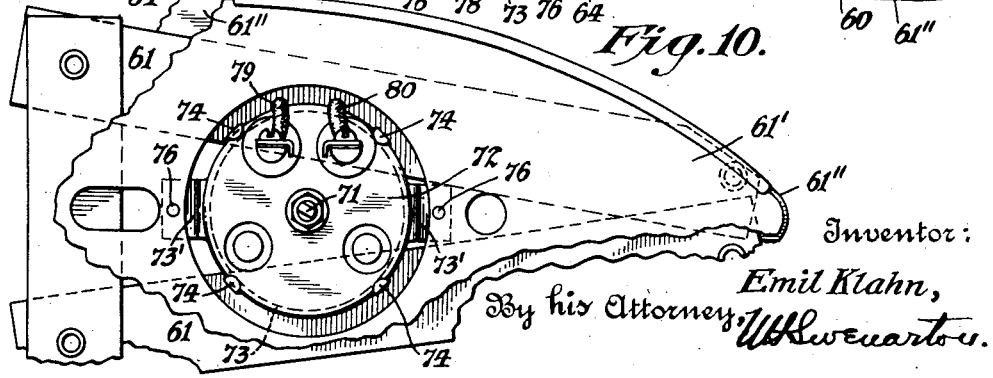
Inventor:
Emil Klahn,
By his Attorney

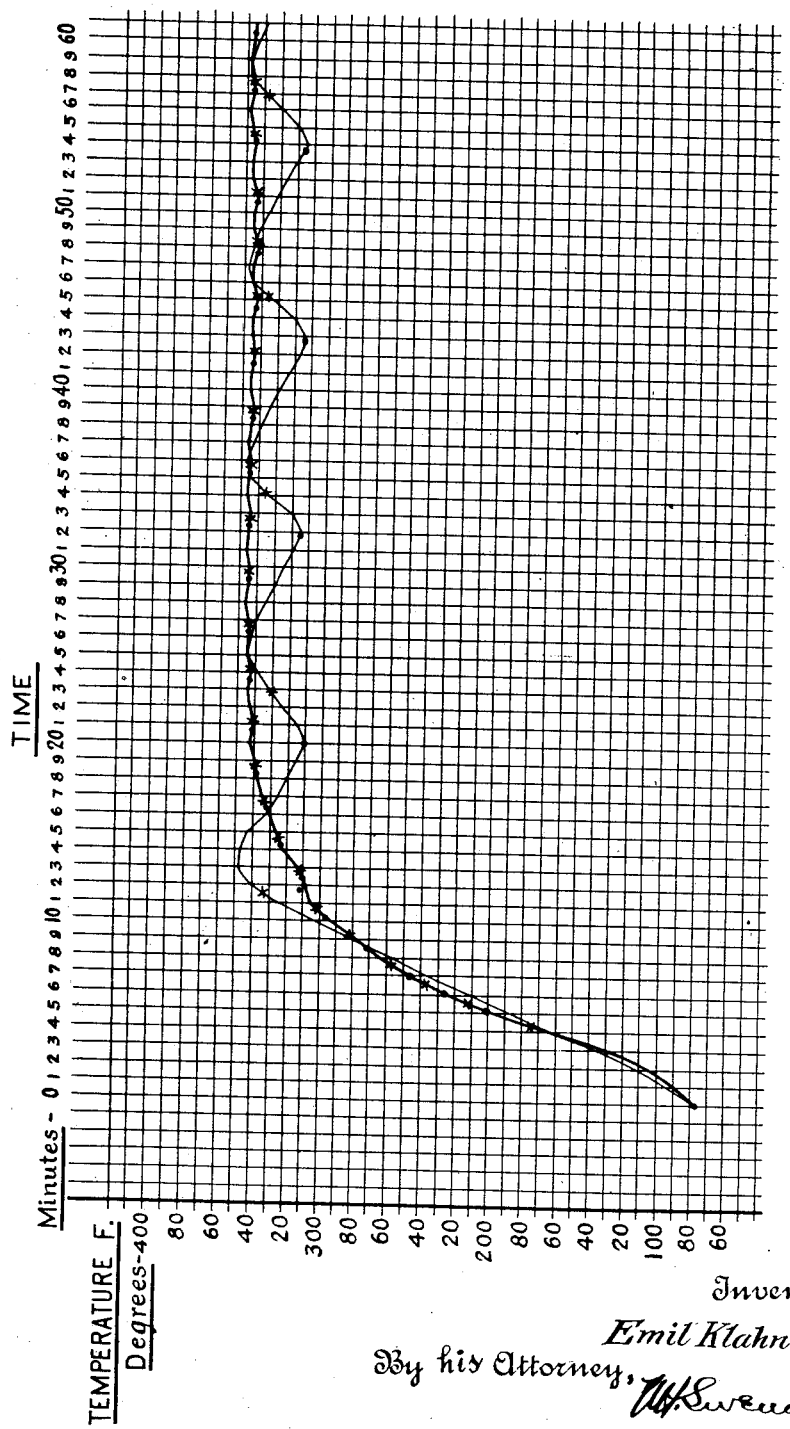

March 7, 1939.  E. KLAHN  2,149,892
THERMOSTATIC DEVICE
Filed Aug. 5, 1931  5 Sheets-Sheet 5

Inventor:
Emil Klahn,
By his Attorney,

Patented Mar. 7, 1939

2,149,892

UNITED STATES PATENT OFFICE 2,149,892

THERMOSTATIC DEVICE

Emil Klahn, New Vernon, N. J.; Johanna Margaret Percival administratrix of said Emil Klahn, deceased Application August 5, 1931, Serial No. 555,211

9 Claims. (Cl. 219—25)

This invention relates to thermostatic devices and more particularly to electrical apparatus, instruments and implements wherein a thermostatic control is required or desired.

Among the objects of my invention are the provisions of an electrical implement, such as an electric sad iron, for example, wherein the temperature of the sole plate is maintained while ironing within a very narrow range of temperature, while at the same time the rapidity with which the iron can be initially brought up to the desired ironing temperature is not impaired.

Further objects of the invention are the provision of a snapping thermostatic switch that is ideally adapted for controlling the current in electric sad irons, electric ranges and for electric controls generally and is substantially unaffected by the wattage of the current controlled thereby. Other advantages of this switch are its adaptability for controlling either direct or alternating current, the cheapness, simplicity and ruggedness of its construction, its sensitivity and the facility with which the temperature of a device equipped therewith can be maintained at an exact predetermined temperature that can be easily adjusted, as desired, through a wide range of temperatures, whereby but a single type of switch serves for a wide variety of uses, whether for heat or cold controls.

My invention is fully described in detail in the following specification and drawings forming a part thereof, in which latter Figure 1 is a plan view, partly broken away, of an electric sad iron embodying my invention;

Fig. 3 is an enlarged, fragmentary, horizontal section of said iron showing the switch mechanism in plan;

Fig. 4 is a transverse vertical section of the same iron showing the switch mechanism in elevation;

Fig. 5 is a section on the line 5—5 of Fig. 4, the binding post being shown in elevation;

Fig. 6 is a diagrammatic view showing the manner in which the switch is connected to the heating coil;

Fig. 7 is a detail, fragmentary, longitudinal section showing essentially the switch mechanism;

Fig. 8 is a fragmentary elevation showing the construction of the upper end of the thermostatic arm;

Fig. 9 is a vertical longitudinal section, partly in elevation, showing a modified form of switch;

Fig. 10 is a fragmentary plan view of the base plate and switch shown in Fig. 9, but with the outer shell and supplemental weighted member removed;

Fig. 11 is a graph showing the comparative temperature curves of the iron embodying my invention as compared with an automatic iron typical of those at present on the market;

Figure 1:
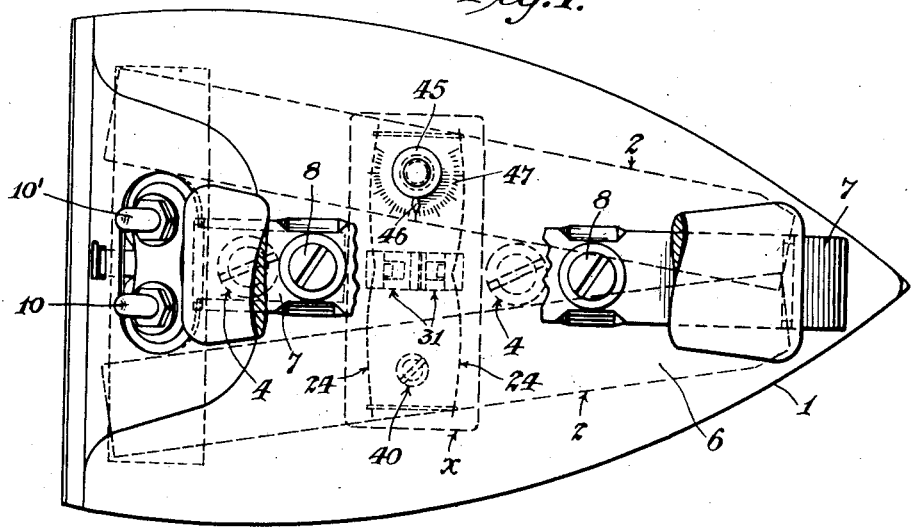
Figure 2:
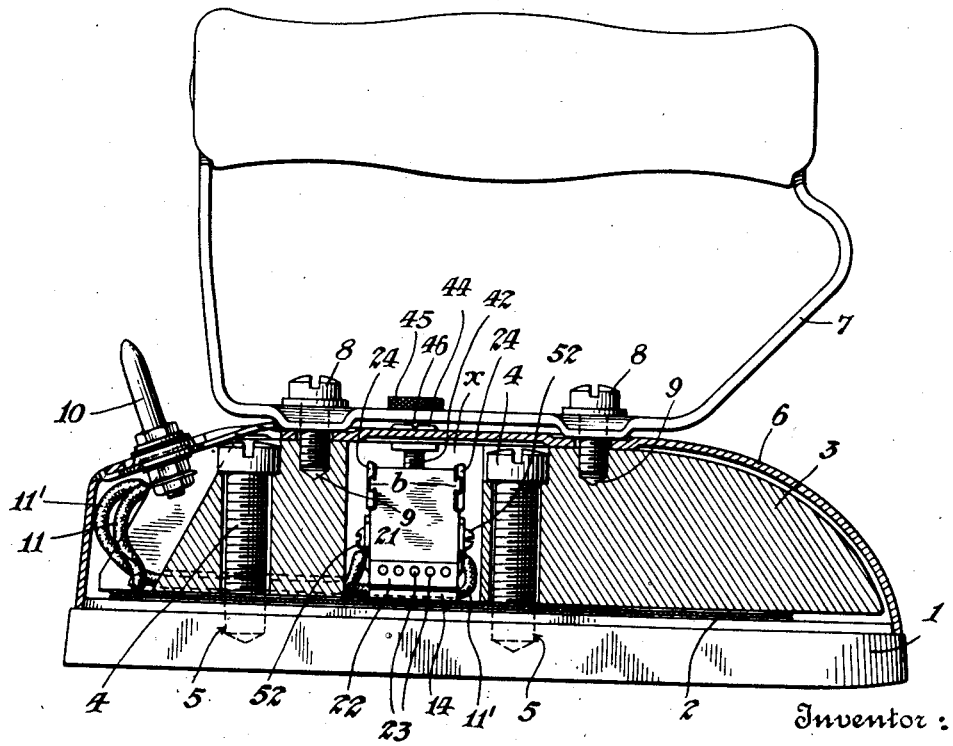
Fig. 2 is a vertical longitudinal section partly in elevation of the same iron.

Referring to the drawings and the construction shown therein, the reference numeral 1 designates the sole plate of my improved iron, the same having a heating element 2 comprising preferably the coil of the well known nichrome resistance wire interposed between insulating strips of mica or the like in accordance with the well known construction, said heating element preferably resting directly on the said sole plate. A weighted member 3, which serves both to supplement the weight of the sole plate and to supply the necessary weight desired, as well as serving as a heat reservoir or hold-over medium, is secured to said sole plate by means of cap screws 4 that project through the holes $x$ provided in said weighted member and are threaded into tapped recesses 5 formed in said sole plate. A removable cover or shell 6 envelopes the aforesaid weighted member and switch mechanism hereinafter described, the same being provided with a handle bracket 7 and cap screws 8 which are threaded into tapped recesses in said weighted member and serve to secure said cover and said handle bracket to the weight and consequently to the sole plate. Terminal posts 10 and 10' are mounted on the rear end of the shell and adapted to receive the usual plug carried by the electric cord which supplies the current from the source of electricity and conductors 11, 11' are respectively connected to said terminals 10, 10' with the opposing ends of the aforesaid coil 2. A casting or pedestal 13, which has opposing lateral arms 14, 14' and base flanges 15, 15', is secured to said sole plate by means of screws which are threaded into tapped recesses 17. The flanged base of said pedestal is preferably inserted into a central recess formed in said sole plate. Immediately above said pedestal and contacting therewith is a plate 18 which serves as the base of my improved switch, the latter being secured to the pedestal 13 by means of screws 19 which are threaded into tapped recesses 20. Thermostatic bimetallic arms for example, comprising a brass element 21 and a high tempered steel element 21', are rigidly clamped between the outer faces of the upturned ends a of said supporting plate 18 and the supplemental clamping plate 22, being securely held therebetween by means of rivets 23.

Snapping elements or membranes 24 are mounted at their opposite ends on the respective thermostatic arms, said elements being preferably bifurcated at the ends to form upper and lower prongs 25 and 26, respectively, and having arcuate abutments 27 with which such bimetallic arms, as hereinafter explained, have rocking engagement. Each membrane element, which is preferably composed of nichrome alloy of high electrical resistance or other high tempered metal alloy of the order of nichrome alloy which is capable of maintaining its elasticity at temperatures up to 800 to 1000° C., for example, is centrally deformed by means of deforming clamps comprising an outer convex deforming plate 28 and an inner concave deforming plate 29 with insulation strips 30, such as mica, interposed between such plates. Contact members 31, having oppositely disposed angular ends 31' are secured to said deforming plates by means of rivets 32, which latter also serve to hold said deforming plates and said membrane elements in an assembled position. Vertically projecting stop members 33, having offset ends 33', are secured to the top of said thermostat by means of screws 34 which project through enlarged apertures in the said ends 33'. Insulation strips 35 and 36 are interposed above and below said offset ends or feet 33' to insulate the same from the metal washers 37, the screws 34 and the plate 18.

A shop-regulating screw 40, which projects through an aperture in said plate 18 and is threaded into a tapped recess 41 in the arm 14 of the pedestal 13, serves to downwardly depress or warp the plate 18 to the extent desired and to thereby permit of the setting of the switch to operate at a predetermined optimum temperature while a post 42, which is provided with a threaded portion 43, is threaded through a stationary bushing 44 and is adapted to also downwardly warp said plate 18 and thereby permit of the external control of the temperatures at which the switch operates by the mere rotation of the knurled knob 45 to a predetermined position which is indicated by a pointer or arrow 46 as it passes over the graduations 47 on the top of the shell 6.

As shown, the switch element is interposed in the conductor 11' which connects one end of the coil of the heating element 2 to the left prong 10' (see Fig. 6), the ends of said interrupted conductor 11 being respectively connected to opposing binding posts 50 which are provided with clamping elements 51 and screws 52 for that purpose. Said posts 50, 50' are secured to opposite sides of one of the arms 18 by means of screws 53 which pass through enlarged holes in the offset ends of said posts 50 and are threaded into tapped recesses in the arm 18. Insulation strips 55 and 56 are interposed between the washers 57 and said offset ends as well as between the latter ends and the plate 18. From the respective binding posts 50, supplemental conductors extend to the opposing contact members 31 to which they are connected by means of the rivets 32.

In the construction illustrated in Figs. 9 and 10, wherein my invention is shown applied to a well known type of thermostatic switch now in commercial use, the numeral 60 designates the sole plate, 61 the heating coil or element and 61', 61"

metal plates for encasing the heating element, which plates are insulated in the well known manner from the coil of the heating element by mica strips or like insulation. A weight member 62 having a central aperture y, serves in the well known manner both as a heat reservoir and also to supplement the weight of the sole plate, the same being secured to the sole plate by cap screws 63 which are threaded at their lower ends into tapped recesses 64. A cover or shell 65 is in turn secured to the weight 62 by means of a cap screw 66 which is threaded into a tapped recess 67 and the usual handle bracket is riveted to said shell. A bimetallic snapping disc 70 of well known construction and function is mounted on the bottom of a pivot 71 carried by a support 72 that is in turn mounted on a plate or bracket 73 having downwardly projecting lugs 73' which extend beneath the rim of the central aperture in the cover plate 61'. Ears 74, integral with the plate or bracket 73, serve to secure said support 72 to said bracket and the rivets 76 secure the offset ends of the lugs 73' to the cover 61'. Contact elements 77 carried by the disc 70 co-operate with and bridge the adjacent fixed contacts 78 on the support 72, which latter contacts are connected by conductors 79 and 80 to the opposite sides of a gap in the circuit of the heating element in the well known manner.

In the construction shown in Figs. 9 and 10, the thermostatic metal disc 70 is, as shown, mounted distant from the sole plate, but is connected metallically with the sole plate, in lieu of being buried therein as is the case in the commercial iron of this general type now on the market, whereby as hereinafter explained, it is possible to control the temperature of the sole plate of this type of iron within extremely close limits, irrespective of the fact that the heat characteristic of the disc type of switch employed in such iron, as ordinarily constructed, requires a temperature range of about 40° to effect the snapping movement thereof.

Figure 12:
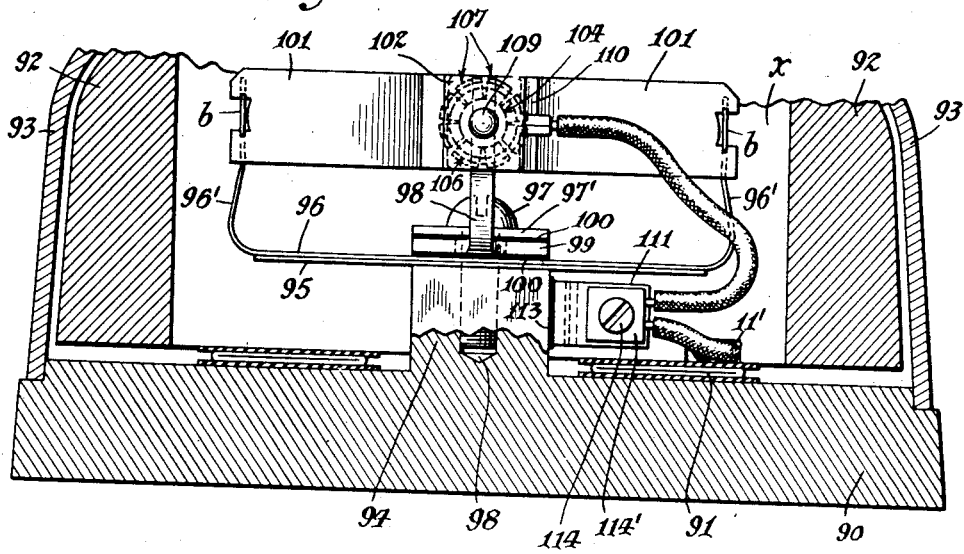
Fig. 12 is a fragmentary, transverse, vertical section showing a still further modified form of switch.
Figure 13:
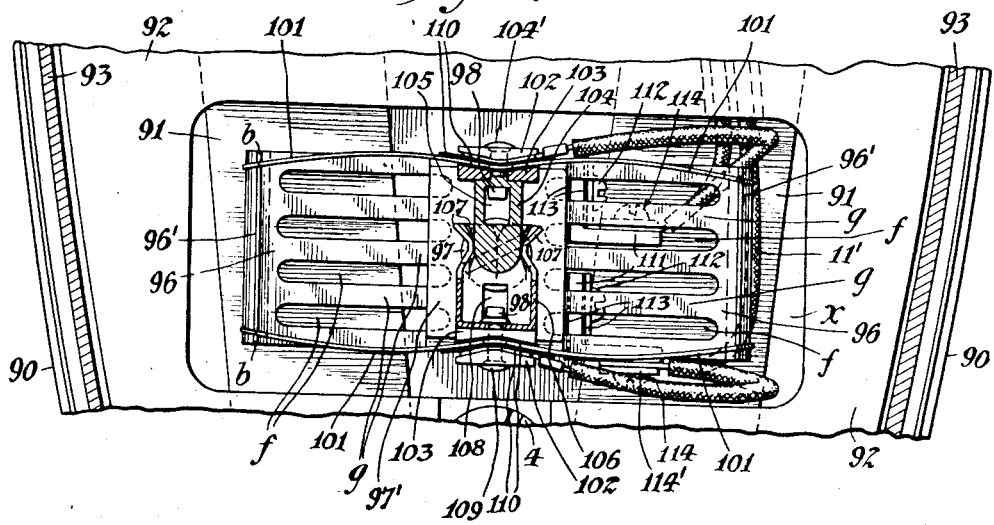
Fig. 13 is a plan view, partly in section, of the switch mechanism shown in Fig. 12.

In Figs. 12 and 13, a construction generally similar to that shown in Figs. 1 to 8, inclusive, is illustrated, except that the sole plate is provided with an integral pedestal and the contact elements comprise ball and socket members. In this construction the sole plate 90, which supports the coil 91, the weight 92 and shell 93, has an integral pedestal 94 on which is mounted the bimetallic element which has slots f and webs g and consists of a brass element 95 and a steel element 96, each of similar composition to the corresponding elements 21, 21' of the bimetallic element shown in Fig. 4. The steel element 96 is provided with integral upwardly extending vertical ends 96' that are of similar shape at their free ends to the upper ends of the bimetallic arms shown in Figs. 3 and 4. A screw 97 carrying a washer 97' is tapped into a threaded recess 98 of said pedestal and serves to secure the bimetallic element and the bases 99 of vertical stop members to the top of the pedestal, said bases 99 being insulated from said bimetallic element, said washer 97', screw 97 and pedestal 94 by top and bottom insulation strips 100.

Snapping membranes 101 are secured by their ends to the upright arms 96' in the same manner as the membranes 24 shown in Fig. 3 are secured to the upright bimetallic metal arms. Convex and concave deforming or clamping plates or blocks 102 and 103 respectively, the latter carrying a contact member 104, serve when clamped together by the binding post 104' to centrally deform the membranes 101 in a manner similar to that in which the membranes 24 are deformed. The contact member 104 is apertured to receive the upper end of one of the stop members 98 and at its free end the same is shaped to conform substantially to a hemisphere so that it constitutes a ball member which is adapted to project into a socket formed by the end 107 of the opposing tubular contact 106. The latter contact is also apertured to receive the free end of the other stop 98 and a binding post 109 serves to secure said contact 106 and the other membrane 101 to the other deforming blocks 102 and 103. Insulation strips 110 serve to electrically insulate the contacts from the membrane elements. The contact element 106 is connected elctrically to the binding post 11, which is secured to the pedestal 94 by means of screws 112, but is electrically insulated therefrom by means of an insulation strip 113 while the contact element 104 is electrically connected to an adjacent binding post 11, which is likewise secured to, but insulated from the pedestal 94 by insulation strips 113. Preferably washers 114' are interposed between the head of the screws 114 and said insulation strips in order to protect the latter. The switch in this construction is mounted in the hole or chamber $x$ formed in the weight 92. Said slots $f$ and webs $g$ serve to permit of the more rapid heating and cooling of the thermostatic metal element in response to the heating and cooling of the heating coil due to the more efficient circulation afforded to the air currents in the chamber $x$.

Each snapping element employed in the constructions shown in Figs. 1, 5, 7, 12 and 13, may well be of any suitable configuration, but is preferably formed as a flat ribbon, is composed of an elastic or spring-like, heat-resisting metal, such for example as the alloy commonly used for the resistance heating coils of electric irons and implements consisting solely of nickel and chromium, in the proportions of about 65 parts of nickel and 35 parts of chromium, commonly termed nichrome, or an alloy composed of 65 parts of nickel, 15 parts of chromium, 12 parts parts of iron and 8 parts of managanese, or in fact, any other elastic or spring-like alloy of the order of the aforesaid nickel chromium alloys, insofar as its ability to retain substantially unimpaired, its co-efficient of elasticity the same as do such nickel-chromium alloys at temperatures of 750° F., 850° F. or even at 1000° F. Elastic or spring steel, such as so-called Invar steel, for example, which is commonly employed as the steel or ferrous metal element of bimetallic thermostatic metal has been found far less satisfactory for use as the membrane element in constructions shown in Figs. 1, 5, 7, 12 and 13, because of the fact that while its co-efficient of elasticity is restored on cooling, such steel or metal does not retain its elasticity at high temperatures, such as 750° F., 850° F. or even 1000° F. and therefore any snapping action that can be accomplished therewith in such construction is extremely unreliable, uncertain and irregular.

It is highly desirable in constructions as herein described that the thermostatic element should be disposed or located in a region of the iron wherein it is exposed to the direct rays of heat emanating from the resistance heating element, which latter usually comprises a coil of the usual nichrome wire interposed between sheets of mica, and also that the same be primarily influenced by the heat emanating from such element, as contradistinguished from the heat carried solely by conduction from the sole plate to said thermostatic element. Furthermore, the thermostatic element is preferably so mounted that the major portion thereof projects into space and is only in metal-to-metal contact at its center with the sole plate and thereby not only is the thermostatic element free to be influenced directly by the heating element, but it tends to more readily and quickly cool when the current through the heating coil is shut off and thereby the switch is far more responsive to the changes in temperatures of the heating element, as distinguished from the mere change in temperature of the sole plate of the iron.

The function of the arcuate abutments or shoulders 27 in the bifurcated ends of the membrane 24 or 101, is to insure a thrust along the median longitudinal line or axis of such membranes by the bi-metallic thermostatic elements 21, 21' (Figs. 3 and 4) or by the arms 96' (Fig. 12) and thereby a more uniform closure and separation of the contacts is accomplished upon the contraction or expansion of the thermostatic elements to which the movements of the membrane are responsive.

In the graph shown in Fig. 11, the heavy line represents the temperature curve of an electric iron embodying my invention and the dots and crosses indicate the exact intervals when the circuit is closed and opened respectively by the switch. The light line represents the temperature curve of a well known commercial iron equipped with another thermostatic control of well known type tested under the same conditions. Attention is called to the fact that, notwithstanding the repeated interruptions of the circuit through the iron, as indicated by the heavy line temperature curve, the temperature of the sole plate steadily rises during the period that the iron coming up to the optimum temperature, say 300° F. to 310° F., whereas in the iron represented by the light line curve, although the current is not cut-off or interrupted at all until the iron reaches a temperature of about 330° F., the actual time required to bring the iron up to temperature is approximately the same, viz: about 10 minutes as is the case with the iron represented by the heavy line curve. Accordingly, it will be apparent that I obtain accuracy of regulation without any substantial sacrifice of efficiency insofar as the time required to bring the iron to the optimum temperature is concerned. As a matter of fact, should it be desired to decrease the heating-up period, it can be accomplished either by employing a heating element of higher wattage or capacity or else the resistance heating coil can be positioned closer to the bottom face of the sole plate by employing a thinner sole plate and correspondingly increasing the thickness and weight of the weighted member 3 or 92, for example.

Notwithstanding the fact that I employ twin snapping elements, such as the membranes or ribbons 24 or 101, in order to obtain a maximum speed of movement of the opposing contact members during the snapping make and break actions thereof and also to increase to a maximum the extent of the penetration of the ball contact member 104 into the socket member 106, nevertheless it is possible to secure a substantial synchronous or simultaneous movement of the opposing membranes by virtue of the fact that the moment one of them snaps it tends to relieve, or increase, the pressure exerted by the supporting arms on the ends of the other membrane element and thereby such latter element tends to move almost synchronously with the first element, even though the two elements may not be exactly of the same length or have exactly the same pressure applied thereto by the supporting arms. As a consequence of this simultaneous movement of the opposing snapping membranes, it is possible to insure a more complete wiping action or extended engagement of the opposing contacts on each other, as well as obtaining an extremely rapid make and break of the opposing contacts. As a matter of fact, were the respective membranes separately mounted, each on its own thermostatic support, it would be far more difficult, if not impossible, to obtain this extremely rapid movement thereof which is desired, synchronously with each other, whereas, by mounting both membranes on the same upright supports, which are responsive to the movements of the thermostatic metal, it is, as above stated, possible to obtain a highly synchronous and extremely rapid separation and approach of these membranes with respect to each other. And thereby my improved switch is admirably adapted both for direct and alternating currents of relatively high wattage.

Wherever in the claims the small portion of the heating means is referred to as being an integral part of the unitary heating means, such expression is deliberately employed in order to differentiate such integral small portion from an auxiliary element constituting a part of an aggregate heating means.

Various changes and modifications of the construction herein shown, within the scope of the patent claims, may be made without departing from the spirit of my invention.

Having thus described my invention, what I claim and desire to obtain by United States Letters Patent is:

1. In an automatic electrical ironing appliance, the combination comprising a sole plate to be heated, a rugged, insufficiently sensitive, snap-acting, thermostatic switch associated with said sole plate including a bi-metallic thermostatic membrane element, unitary electrical resistance means, controlled by the snapping actions of said switch, for heating said sole plate and the thermostatic element of the switch, the principal portion of said electrical resistance means being metallically shielded from said thermostatic element and a small integral portion of said unitary electrical resistance means being exposed and in metallically unshielded relation to said thermostatic element and said thermostatic element being disposed to one side of the zone in which said principal portion of the heating means is positioned and in close proximity to the top of the sole plate and being metallically connected thereto in good heat conductive relation therewith so that abrupt variations in temperature of said small portion of the heating means primarily induces movements of said thermostatic member after an optimum temperature, which it is desired to maintain in said sole plate has been attained, the arrangements and proportions of the parts being such that the rapid heating and cooling of said thermostatic element of the switch compensates for the lack of sensitivity of the switch.

2. In an automatic electric iron, the combination comprising a sole plate, unitary electrical resistance means for heating said sole plate, a rugged, inherently insensitive snap-acting thermostatic switch, including a bi-metallic thermostatic member mounted to one side of the zone in which said heating means is positioned and in close proximity to the top of the sole plate and being metallically connected thereto in good heat conductive relation therewith, said electrical resistance heating means being in circuit with said switch and controlled thereby and the principal portion of said heating means being metallically shielded from said thermostatic member and adapted to directly heat said sole plate and a minor integral portion of said unitary heating means being exposed and in metallically unshielded relation to said thermostatic member; the arrangements and proportions of the parts being such that the rapid heating and cooling of said thermostatic element of the switch compensates for the lack of sensitivity of the switch.

3. In an automatic electric ironing device, the combination comprising a sole plate, electrical resistance heating means, a rugged, inherently insensitive snap-acting thermostatic switch, including a bi-metallic thermostatic member, controlling the circuit of said resistance heating means, said switch including a bi-metallic thermostatic member mounted above the zone in which said heating means are located and in proximity to the top of the sole plate and snapping membraneous means responsive to the movements of said thermostatic member, said membraneous means being composed of an alloy containing nickel and chromium and being capable of retaining the original elasticity thereof substantially unimpaired at a temperature of at least 600° F., the principal portion of the resistance heating means being metallically shielded from said thermostatic member and being adapted to directly heat said sole plate and being intimately associated therewith and a minor portion of said heating means being exposed and in metallically unshielded relation with respect to said thermostatic member and being disposed relatively remote therefrom; the arrangements and proportions of the parts being such that the rapid heating and cooling of said thermostatic element of the switch compensates for the lack of sensitivity of the switch.

4. In a thermostatically controlled automatic ironing appliance, the combination comprising a sole plate, the temperature of which it is desired to accurately control, unitary electrical resistance heating means disposed in said appliance, the principal portion of said heating means being arranged to directly heat the sole plate, a rugged, snap-acting, inherently insensitive thermostatic switch assembly, including a metal thermostatic member, said thermostatic member being disposed remote from said principal portion of the heating means and outside of said sole plate and being directly exposed to heat rays emanating from a relatively small integral portion of said unitary heating means while being metallically shielded from the heat emanating from the principal portion of said heating means; the arrangements and proportions of the parts being such that the rapid heating and cooling of said thermostatic element of the switch compensates for the lack of sensitivity of the switch.

5. In an automatic electric ironing appliance, the combination of a sole plate, electrical resistance heating means directly associated with the sole plate, including an electrical resistance element and a metal cover plate that is apertured to expose a small portion of such resistance heating element thereof, a rugged, inherently insensitive, snap-acting thermostatic switch assembly, including a thermostatic metal element, for controlling the circuit through said resistance element in response to movements of said thermostatic metal element, said latter element being disposed to one side of the zone in which the resistance element is located and in proximity to the top of the sole plate and being exposed directly and in metallically unshielded relation with said small portion of the resistance element while being metallically shielded from the heat emanating from the principal portion of said heating means, whereby it becomes more directly responsive to the variations in temperature of such small portion of the heating element than to the temperature of the sole plate; the arrangements and proportions of the parts being such that the rapid heating and cooling of said thermostatic element of the switch compensates for the lack of sensitivity of the switch.

6. An electrical ironing appliance, comprising a pressing body, unitary electrical resistance heating means, a thermostatic switch including a metal thermostatic member, having appreciable differential between opening and closing temperatures, closely associated thermally with said body to control the temperature thereof by controlling the operation of said unitary heating means, and said latter means including a main portion metallically shielded from said thermostatic member which is adapted to primarily heat said sole plate and also including a relatively small integral portion disposed in metallically unshielded relation with respect to the thermostatic member and adapted to heat the same more intensely than the said metallically shielded main portion of the heating means when the circuit through the heating means is closed; and the major portion of said thermostatic member of the switch being positioned in proximity to the top of the sole plate and above said main portion of said heating means; said small portion of the heating means serving to compensate for the differential between opening and closing temperatures of the switch and/or for the inherent time lag in temperatures between said thermostatic switch and said pressing body.

7. An electrical ironing device, comprising a sole plate, unitary electrical resistance heating means, a rugged, inherently insensitive, snap-acting thermostatic switch disposed in the circuit of said heating means and controlling the same, said switch including a bi-metallic thermostatic member and said unitary heating means including a main portion of relatively large electrical resistance, which portion is metallically shielded from said thermostatic member and adapted to primarily heat said sole plate, and also including a minor integral portion of relatively small electrical resistance, in series with said main portion, which is in metallically unshielded relation to said thermostatic member and adapted to heat the latter, said thermostatic element of the switch being positioned in immediate proximity to the top of the sole plate and substantially above the zone in which the main portion of said heating means is located and being so positioned with respect to the minor portion of such heating means as to be primarily affected by and operated in consonance with the heating and cooling of such minor portion; the arrangement and proportion of the parts being such that the rapid heating and cooling of the said minor portion of the heating means, in response to the operation of the switch, compensates for the lack of sensitivity of the switch and permits of the maintenance of an optimum temperature in the sole plate.

8. An electrical ironing appliance, comprising a pressing body, unitary electrical resistance heating means, a thermostatic switch including a metal thermostatic member, having appreciable differential between opening and closing temperatures, closely associated thermally with said body to control the temperature thereof by controlling the operation of said heating means, and said latter means including a main portion metallically shielded from said thermostatic member which is adapted to primarily heat said sole plate and also including a relatively small portion integral with said main portion and so disposed with respect to the thermostatic member and to the pressing body that, once the optimum temperature in the sole plate at which, when attained, the said switch is set to open, it is adapted when said switch is closed during the periodic operations thereof to more intensely heat the thermostatic member than does said metallically shielded main portion of said heating means and thereby serving to compensate for the differential between opening and closing temperatures of the switch and/or for the inherent time lag in temperatures between the thermostatic member of said switch and said pressing body.

9. An electrical ironing device, comprising a sole plate, unitary electrical resistance heating means, a rugged, inherently insensitive, snap-acting thermostatic switch disposed in the circuit of said heating means and controlling the same, said switch including a bi-metallic thermostatic member and said heating means including a main portion of relatively large electrical resistance, which portion is metallically shielded from said thermostatic member and adapted to primarily heat said sole plate, and also including a minor portion integral with said main portion and of relatively small electrical resistance, in series with said main portion, said thermostatic member being so disposed with respect to the sole plate and such minor portion of said heating means that, once the optimum temperature in the sole plate at which, when attained, the said switch is set to open and when the switch is closed during the periodic operations thereof, such thermostatic member is more intensely heated by such minor portion of the heating means than by said metallically shielded main portion thereof and thereby the switch opens and closes in direct response to the heating and cooling of such minor portion of the heating means, the arrangement and proportion of the parts being such that the rapid heating and cooling of the said minor portion of the heating means, in response to the operation of the switch, compensates for the lack of sensitivity of the switch and permits of the maintenance of such optimum temperature in the sole plate.

EMIL KLAHN.